(12) United States Patent
McCune, Jr.

(10) Patent No.: US 7,929,644 B2
(45) Date of Patent: Apr. 19, 2011

(54) INSTANT-ACQUISITION CLOCK AND DATA RECOVERY SYSTEMS AND METHODS FOR SERIAL COMMUNICATIONS LINKS

(75) Inventor: Earl W. McCune, Jr., Santa Clara, CA (US)

(73) Assignee: Panasonic Corporation, Osaka (JP)

( * ) Notice: Subject to any disclaimer, the term of this patent is extended or adjusted under 35 U.S.C. 154(b) by 579 days.

(21) Appl. No.: 12/024,774

(22) Filed: Feb. 1, 2008

(65) Prior Publication Data

US 2009/0196387 A1    Aug. 6, 2009

(51) Int. Cl.
*H04L 27/14* (2006.01)
(52) U.S. Cl. .................................. 375/326; 375/355
(58) Field of Classification Search .................. 375/355, 375/326, 327
See application file for complete search history.

(56) References Cited

U.S. PATENT DOCUMENTS

| | | |
|---|---|---|
| 7,142,623 B2 | 11/2006 | Sorna |
| 2003/0161430 A1* | 8/2003 | Sou ............................... 375/376 |
| 2004/0036516 A1 | 2/2004 | Kim |
| 2005/0091559 A1 | 4/2005 | Vining |
| 2005/0238126 A1 | 10/2005 | Ribo et al. |
| 2005/0254456 A1* | 11/2005 | Sakai et al. .................. 370/328 |

FOREIGN PATENT DOCUMENTS

| | | |
|---|---|---|
| EP | 1 009 125 | 6/2000 |
| EP | 1 306 999 | 5/2003 |

OTHER PUBLICATIONS

M. Ramezani et al., "Jitter analysis of a PLL-based CDR with a bang-bang phase detector," 2002 45th Midwest Symposium in Circuits and Systems, Aug. 4-7, 2002, p. 393-396, vol. 3.
M. Ramezani et al., "An improved bang-bang phase detector for clock and data recovery applications," 2001 IEEE International Symposium on Circuits and Systems, May 6-9, 2001, pp. 715-718, vol. 1.
Park, Jun-Young et al., "A 1.0 Gbps CMOS Oversampling Data Recovery Circuit with Fine Delay Generation Method", IEICE Trans. Fundamentals, vol. E83-A, No. 6, Jun. 2000, pp. 1100-1105.
Kitazawa, Masakazu et al., "A Bit Synchronization Technique for PDS Optical Subscriber Loop Systems"; Telecommunications Division, Hitachi, Ltd. Yokohama, Japan; 1991, pp. 8.2-1 through 8.2-10.

* cited by examiner

*Primary Examiner* — Kevin Y Kim

(57) ABSTRACT

Methods and systems for recovering clock and data in data streams communicated over serial communications links. An exemplary serial communications receiver system includes a line receiver configured to receive a data stream from a serial communications link and an instant-acquisition clock and data recovery circuit coupled to the line receiver. The instant-acquisition clock and data recovery circuit includes a time interval detector and a sampling clock selector. The time interval detector is operable to sample the data stream received by the line receiver according to a multi-phase set of sampling clocks. The sampling clock selector is operable to designate one of the sampling clocks of the multi-phase set of sampling clocks as a recovered clock, based on a data transition in the received data stream detected by the time interval detector. The clock selector is configured to designate the sampling clock as the recovered clock independent of data transitions in the data stream that may have occurred prior to the data transition detected by the time interval detector.

23 Claims, 10 Drawing Sheets

| Last Data transition is in subinterval : | Select, and keep using, this sampling clock: |
|---|---|
| W | /clk |
| X | /Qclk |
| Y | clk |
| Z | Qclk |

| Present Subinterval | Prior Subinterval | UP | DN |
|---|---|---|---|
| W | W | TS | TS |
| W | X | active | TS |
| W | Y | TS | TS |
| W | Z | TS | active |
| X | W | TS | active |
| X | X | TS | TS |
| X | Y | active | TS |
| X | Z | TS | TS |
| Y | W | TS | TS |
| Y | X | TS | active |
| Y | Y | TS | TS |
| Y | Z | active | TS |
| Z | W | active | TS |
| Z | X | TS | TS |
| Z | Y | TS | active |
| Z | Z | TS | TS |

INSTANT-ACQUISITION CLOCK AND DATA RECOVERY SYSTEMS AND METHODS FOR SERIAL COMMUNICATIONS LINKS

FIELD OF THE INVENTION

The present invention relates generally to serial communications. More specifically, the present invention relates to methods and systems for clock and data recovery in serial communications links.

BACKGROUND OF THE INVENTION

Serial communications is a process that involves sequentially communicating a stream of data bits over a serial communications link. Serial communications is used in a wide variety of applications, many of which are defined by their own unique standards. A few examples include, the Serial Advanced Technology Attachment (SATA) standard, which sets forth serial communication specifications for transferring data between a computing device (e.g., a personal computer) and a data storage device (e.g., a computer hard drive); the Universal Serial Bus (UBS) standard, which specifies the transfer of data between a computing device and a peripheral device; and the DigRF standard, which specifies a digital serial communications link between a baseband controller and radio in a cellular handset.

FIG. 1 is a drawing of a typical two-way serial communications system 100 having differential upstream and downstream serial links 102 and 104. The two-way serial communications system 100 includes an uplink line driver (LD) 106, an uplink line receiver (LR) 108, a downlink LD 110, and a downlink LR 112. The uplink LD 106 is configured to transmit a digital data stream comprised of a sequence of data bits upstream to the uplink LR 108, via the upstream serial link 102. Similarly, the downlink LD 110 is configured to transmit a digital data stream downstream to the downlink LR 112, via the downstream serial link 104.

The uplink LD 106 is clocked by a first high-frequency clock, and the downlink LD 110 is clocked by an independently generated second high-frequency clock. The first high-frequency clock is generated by a first clock synthesizer 114, based on a first low-frequency clock provided by a first oscillator 116. The second high-frequency clock is generated by a second clock synthesizer 118, based on a second low-frequency clock provided by a second oscillator 120.

Because the first and second high frequency clocks are not transmitted along with the data streams, and the LRs 108 and 112 are not otherwise synchronized with the LD clocks, some phase alignment mechanism must be provided to establish proper phase relationships between the local clocks at the LRs 108 and 112 and the data bits received by the LRs 108 and 112. First and second clock recovery circuits 122 and 124, which are coupled to the uplink and downlink LRs 108 and 112, respectively, serve to perform these phase alignment processes.

It is not uncommon for the phase or frequency of data streams received by one of the LRs 108 and 112 to change or fluctuate over time. To track these changes and fluctuations, each of the clock recovery circuits 122 and 124 is typically implemented within a phase-locked loop (PLL). FIG. 2 is a drawing of a typical PLL-based (or "tracking") clock and data recovery (CDR) circuit 200. The PLL-based CDR circuit 200 comprises a sampling phase detector 202, a charge pump 204, a loop filter 206, and a multi-phase voltage controlled oscillator (VCO) 208. The multi-phase VCO 208 operates to generate a multi-phase set of sampling clocks, for example, clk1, clk2, clk3. The sampling phase detector 202 is configured to receive the multi-phase set of sampling clocks, clk1, clk2, clk3, and use the clocks to sample the incoming data stream. Based on the phase and frequency relationship of the multi-phase set of sampling clocks, clk1, clk2, clk3 and the sampled data, the sampling phase detector 202 generates phase error pulses, Pu and Pd. As explained in more detail below, the charge pump 204 and loop filter 206 respond to these phase error pulses, Pu and Pd, by increasing or decreasing the value of a control voltage signal, $\Delta V_{in}$, applied to the multi-phase VCO 208. The multi-phase VCO 208 responds to changes in the control voltage signal, $\Delta V_{in}$, by increasing or decreasing the frequency of the multi-phase set of sampling clocks. The frequency-corrected multi-phase set of sampling clocks is then fed back to the sampling phase detector 202, which then samples the incoming data stream using the frequency corrected multi-phase set of sampling clocks. The above described process is repeated again and again until the phase error between the multi-phase set of sampling clocks and the clock being recovered from the incoming data is reduced to zero (or some acceptably small amount).

The sampling phase detector 202 in the PLL-based CDR circuit 200 is often comprised of what is known as a "bang-bang" phase detector, a circuit diagram of which is shown in FIG. 3A. The bang-bang phase detector 300 includes first, second and third flip-flops 302-1, 302-2 and 302-3, which are configured to sample the incoming data stream according to the multi-phase set of sampling clocks, clk1, clk2, clk3. Each of the sampling clocks in the multi-phase set of sampling clocks, clk1, clk2, clk3, has the same nominal frequency. However, each individual sampling clock in the set is offset in phase relative to other sampling clocks in the set. More specifically, and as illustrated in the timing diagrams in FIG. 3B, the second sampling clock, clk2, is delayed relative to the first sampling clock, clk1, by ninety degrees, and the third sampling clock, clk3, is delayed relative to the first sampling clock, clk1, by one hundred eighty degrees.

The input data stream is sampled by the first, second and third flip-flops 302-1, 302-2 and 302-3 upon the occurrences of rising edges of the three sampling clocks, clk1, clk2 and clk3. The resulting data samples are coupled to first and second exclusive-OR (XOR) gates 304-1 and 304-2. In addition to serving as a sampling clock for the third flip-flop 302-3, the third sampling clock, clk3, is used to control the enable of the first and second XOR gates 304-1 and 304-2, and to synchronize the phase error pulses, Pu and Pd. A delay element 306 having a delay of equal to one flip-flop delay is inserted in the path of third sampling clock, clk3, so that the enable signals and phase error pulses, Pu and Pd, are properly timed.

The multi-phase set of sampling clocks, clk1, clk2, clk3, is configured in this case so that data transitions in the input data stream occur either between the rising edges of the first and second sampling clocks, clk1 and clk2, or between the rising edges of the second and third sampling clocks, clk2 and clk3. If a data transition occurs between the rising edges of the first and second sampling clocks, clk1 and clk2, the frequency of the clock being recovered is deemed to be lagging the data (frequency too low), and a phase error pulse, Pu, is generated at the output of the first XOR gate 304-1. On the other hand, if a data transition occurs between the second and third sampling clocks, clk2 and clk3, the frequency of the clock being recovered is deemed to be leading the data (frequency too high) and a phase error pulse, Pd, is generated at the output of the second XOR gate 304-2.

The Pu and Pd phase error pulses generated by the first and second XOR gates 304-1 and 304-2 are used to control the charge pump 204 and loop filter 206. As illustrated in FIG. 3C, a positive current source responds to Pu phase error pulses by sourcing current to the loop filter 206, and a negative current source responds to Pd phase error pulses by sinking current from the loop filter 206. Because the loop filter 206 operates as an integrator, the VCO control voltage, $\Delta V_{in}$, increases or decreases depending on whether the charge pump 204 receives a Pu phase error pulse or a Pd phase error pulse respectively. More particularly, receipt of a Pu phase error pulse will result in an acceleration of the VCO output phase, while receipt of a Pd phase error pulse will result in a deceleration of the VCO output phase.

While the PLL-based CDR circuit 300 is capable of regenerating a recovered clock at the LR of a serial communications link, actual data cannot be sent to the LR until the frequency correction process (i.e., "acquisition" process) described above has completed. In other words, before actual data is sent over the link, the PLL must operate to lock to a training sequence (or "header") having a predefined transition pattern that facilitates the acquisition process. Only until after the acquisition process is completed can actual data be reliably communicated over the communications link to the LR.

Because the PLL-based CDR circuit acquisition process is an averaging process implemented in a feedback and control system, it takes on the order of a thousand training sequence bits (i.e., a thousand "unit intervals" (UIs) or more) to complete the acquisition process. This large "header overhead" is highly undesirable since it not only delays actual data communications, but also results in wasted power. To avoid having to unnecessarily repeat the time consuming acquisition process, PLL-based CDR circuits are also typically configured to run continuously, even when the communication link is idle. Unfortunately, running the PLL at all times wastes additional power.

Another problem with the PLL-based CDR circuit 300 is that it is fundamentally incapable of operating in the presence of large frequency errors that can exist between the frequency of the clock being recovered and the multi-phase set of sampling clocks, clk1, clk2, clk3. This is attributable to limits on the possible loop bandwidth of the PLL. The actual frequency of the clock being recovered must therefore be very close in frequency to the frequency of the multi-phase set of sampling clocks, clk1, clk2, clk3, or the PLL will be unable to acquire or lock to the data in the received data stream.

Finally, in order for the PLL-based CDR circuit 300 to work properly, the data streams received by the LRs 108 and 112 must exhibit jitter-open eye patterns. In other words, the peak-to-peak jitter in the data stream received by the LRs 108 and 112 must remain less than a single UI. Otherwise, the PLL-based CDR circuit 300 will be either incapable of recovering the clock and data or the recovered data will have an unacceptably high error rate.

Given the foregoing problems and limitations of the prior art, it would be desirable to have systems and methods for recovering clocks and data in serial communications systems that: are not burdened by large header overheads and time consuming acquisition processes; do not require a PLL or feedback to recover the clocks and data; continue to operate properly even when large frequency errors and high jitter are present; and do not consume large amounts of unnecessary power.

BRIEF SUMMARY OF THE INVENTION

Methods and systems for recovering clock and data in data streams communicated over serial communications links are disclosed. An exemplary clock and data recovery method includes sampling a received data stream using a multi-phase set of sampling clocks and, upon the occurrence of a data transition in the received data stream, designating one of the sampling clocks of the multi-phase set of sampling clocks as a recovered clock. The designated recovered clock is then used to recover data bits in the data stream. According to one aspect of the invention, designating the first sampling clock from among the multi-phase set of sampling clock is performed independent of data transitions in the data stream that have occurred prior to the occurrence of the data transition used to designate the recovered clock.

An exemplary serial communications receiver system includes a line receiver configured to receive a data stream from a serial communications link and an instant-acquisition clock and data recovery circuit coupled to the line receiver. The instant-acquisition clock and data recovery circuit includes a time interval detector and a sampling clock selector. The time interval detector is operable to sample the data stream received by the line receiver according to a multi-phase set of sampling clocks. The sampling clock selector is operable to designate one of the sampling clocks of the multi-phase set of sampling clocks as a recovered clock, based on a data transition in the received data stream detected by the time interval detector. The clock selector is configured to designate the sampling clock as the recovered clock independent of data transitions in the data stream that may have occurred prior to the data transition detected by the time interval detector.

The instant-acquisition CDR methods and systems of the present invention offer a variety of advantages and benefits over prior art CDR approaches. First, clock recovery and data alignment are completed nearly instantaneously following detection of a transition in the received data stream, e.g., within a timeframe that is less than a bit time (or unit interval). The methods and systems do not rely on or require a PLL configured to perform an averaging process to recover the clock and data. Therefore, lengthy acquisition training sequences or headers are avoided by the methods and systems of the present invention. Second, the instant-acquisition methods and systems of the present invention operate even in the presence of a large frequency error. In prior art PLL-based CDR circuits, the clock being recovered from the incoming data stream must be very close in frequency to the local sampling clock of the receiver receiving the data stream. This frequency agility is highly desirable since accurate data recovery can be achieved even in the presence of large amounts of noise and/or jitter. Moreover, because an averaging process is not needed to recover the clock or align the data, a jitter-open eye is not required to accurately and correctly detect and recover the clock and data using the methods and systems of the present invention. Finally, because clock recovery and data alignment are completed instantly, and do not require a long training sequence or header, the instant-acquisition CDR circuits of the present invention can be powered down whenever the communications link is idle (i.e., not transmitting data). This power conserving advantage over prior art approaches is particularly beneficial in applications where the instant-acquisition CDR circuit is used to receive data over a serial communications link configured within a battery-powered communications device (e.g., as may be formed between a baseband controller and a radio in a cellular handset).

Further features and advantages of the present invention, as well as the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 1:
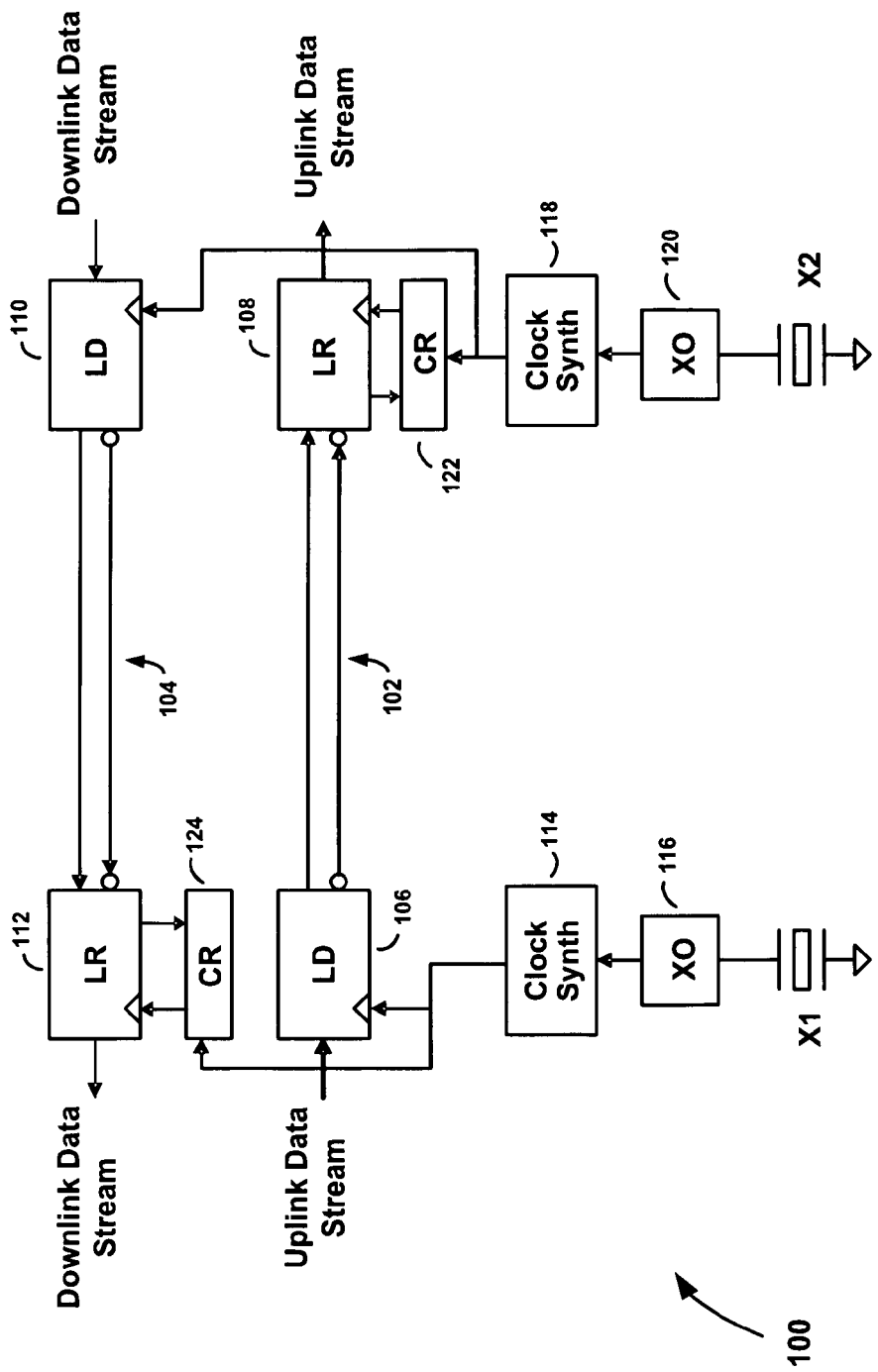
FIG. 1 is a drawing of a typical two-way serial communication system.
Figure 2:
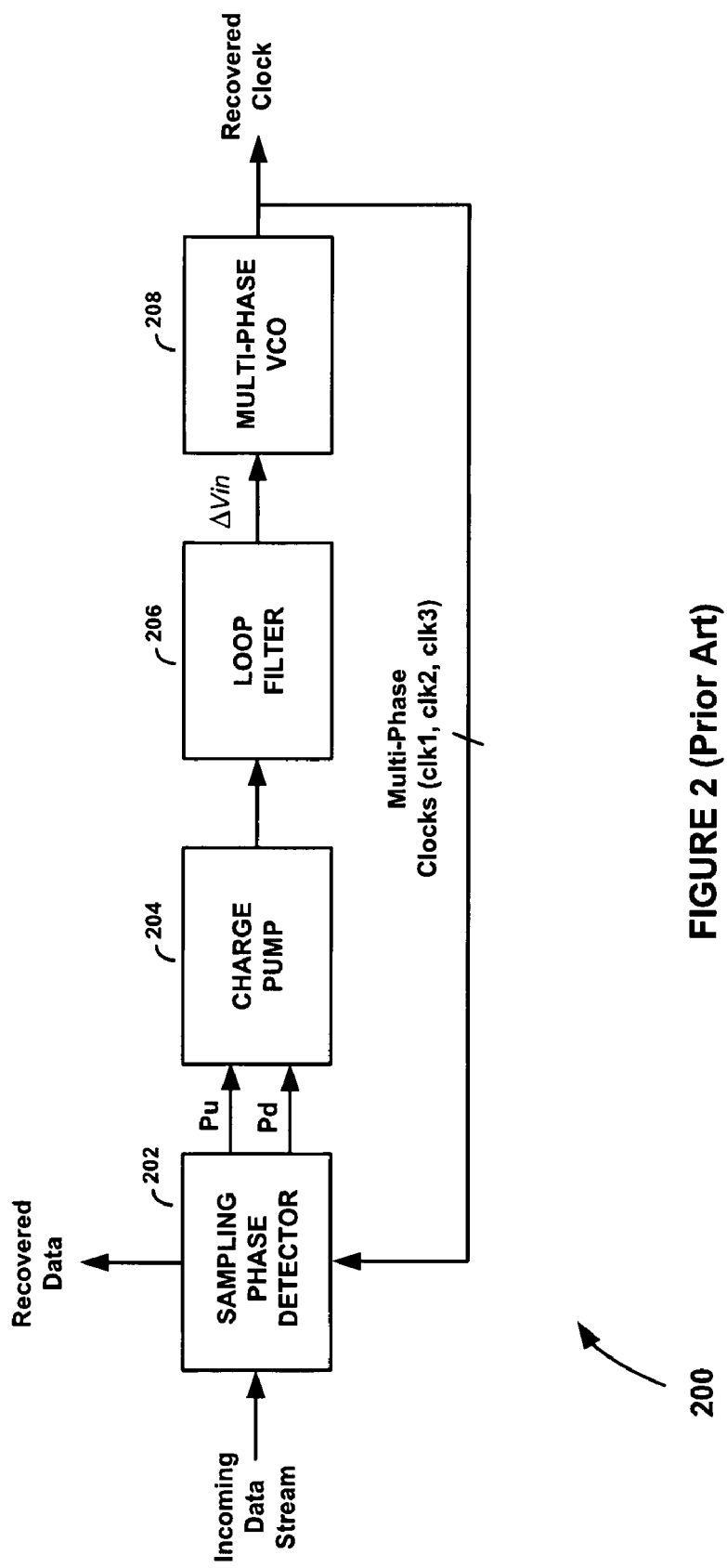
FIG. 2 is a diagram of a conventional PLL-based (or "tracking") clock and data recovery (CDR) circuit.
Figures 3A, 3B, 3C:
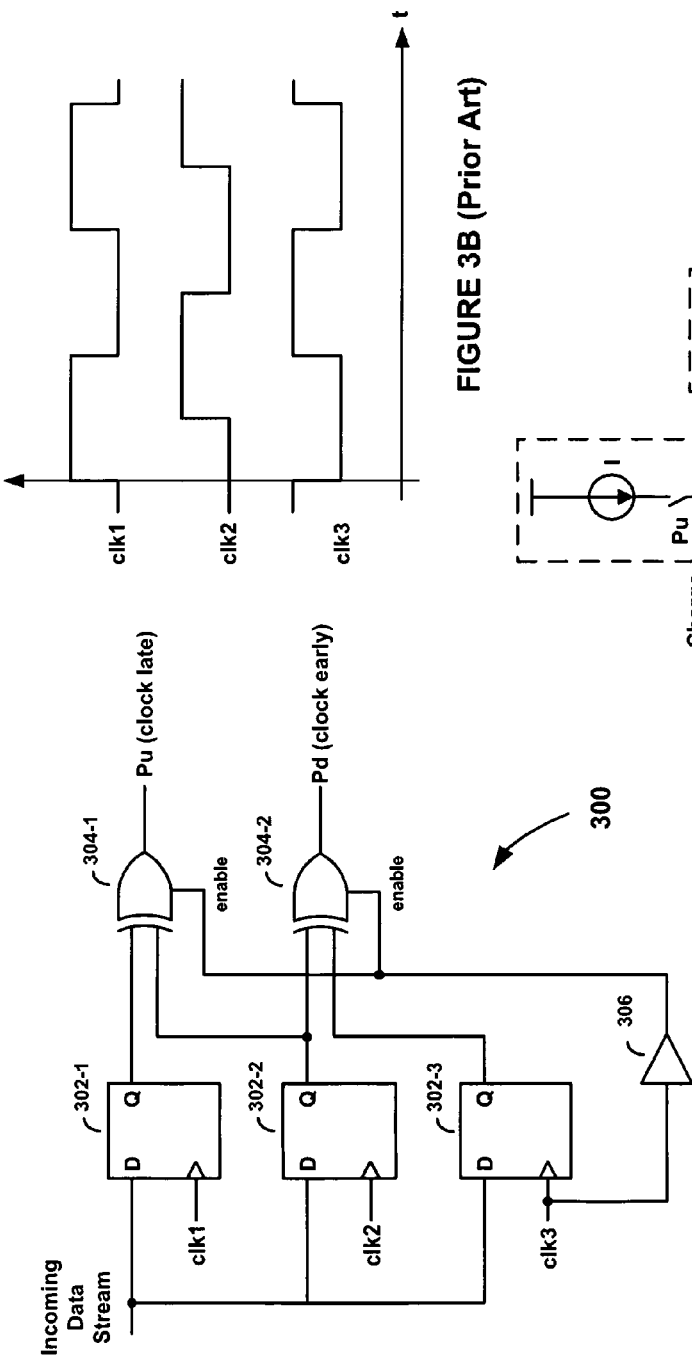
FIG. 3A is a diagram of a bang-bang phase detector used in the conventional PLL-based CDR circuit in FIG. 2.
FIG. 3B is a timing diagram of the multi-phase set of sampling clocks used to clock the bang-bang phase detector in FIG. 3A.
FIG. 3C is a diagram of the charge pump and loop filter used in the conventional PLL-based CDR in FIG. 2.
Figure 4:
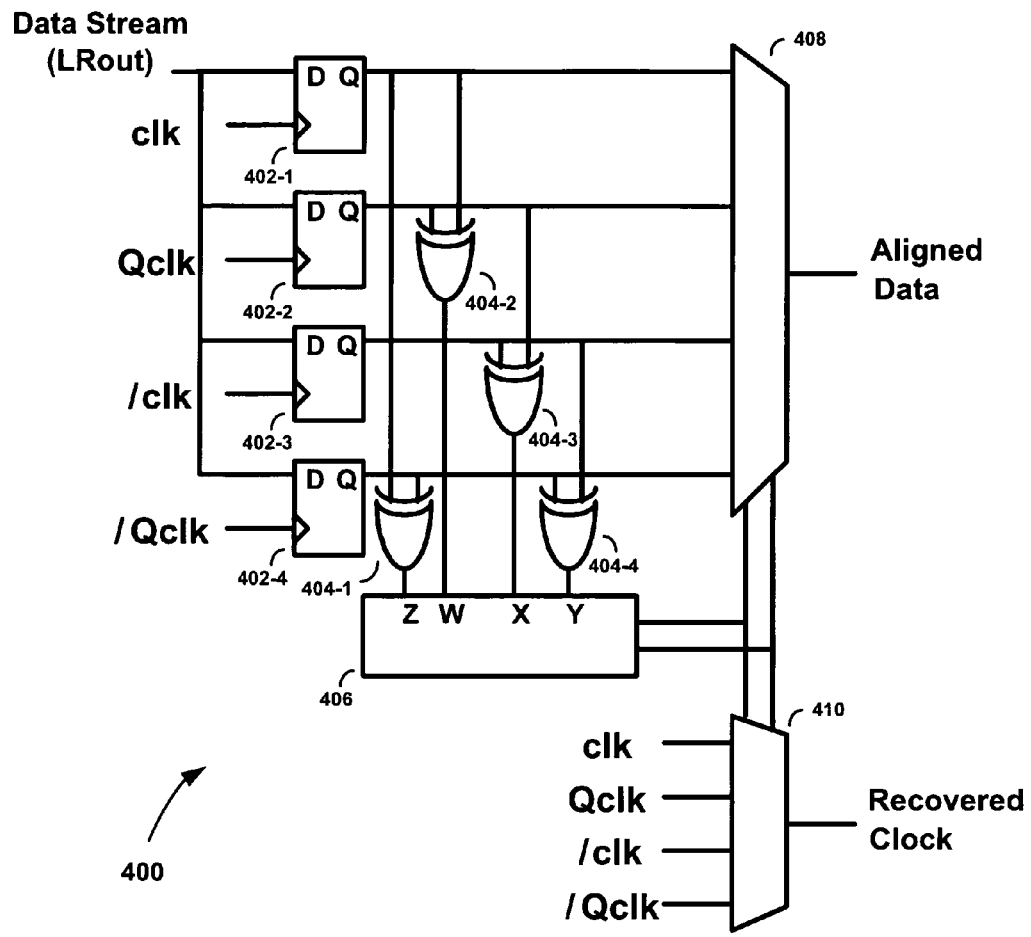
FIG. 4 is a diagram of an instant-acquisition clock and data recovery (CDR) circuit, according to an embodiment of the present invention.

Referring to FIG. 4, there is shown an instant-acquisition clock and data recovery (CDR) circuit 400, according to an embodiment of the present invention. The instant acquisition CDR circuit 400 comprises first, second, third and fourth flip-flops 402-1, 402-2, 402-3 and 402-4; first, second, third and fourth exclusive OR (XOR) gates 404-1, 404-2, 404-3 and 404-4; a data path and clock phase selector 406; an aligned data multiplexer 408; and a recovered clock multiplexer 410. Collectively, and as will be explained in detail below, the first, second, third and fourth flip-flops 402-1, 402-2, 402-3 and 402-4 and first, second, third and fourth XOR gates 404-1, 404-2, 404-3 and 404-4 comprise a time interval detector that is capable of achieving frequency acquisition and data alignment accurately and instantly upon receipt of the first data bit transition in a received data stream.

The first, second, third and fourth flip-flops 402-1, 402-2, 402-3 and 402-4 are configured to receive a multi-phase set of sampling clocks, which in this embodiment includes an in-phase sampling clock, clk, a quadrature sampling clock, Qclk, an inverse sampling clock, /clk, and an inverse-quadrature sampling clock, /Qclk. The first flip-flop 402-1 is configured to receive the in-phase sampling clock, clk; the second flip-flop 402-2 is configured to receive the quadrature sampling clock, Qclk; the third flip-flop 402-3 is configured to receive the inverse sampling clock, /clk; and the fourth flip-flop 402-4 is configured to receive the inverse-quadrature sampling clock, /Qclk. Each sampling clock in the multi-phase set of sampling clocks, clk, Qclk, /clk, /Qclk is set to a nominal or expected frequency that corresponds to the expected data rate of the data stream being sampled.

Figure 5:
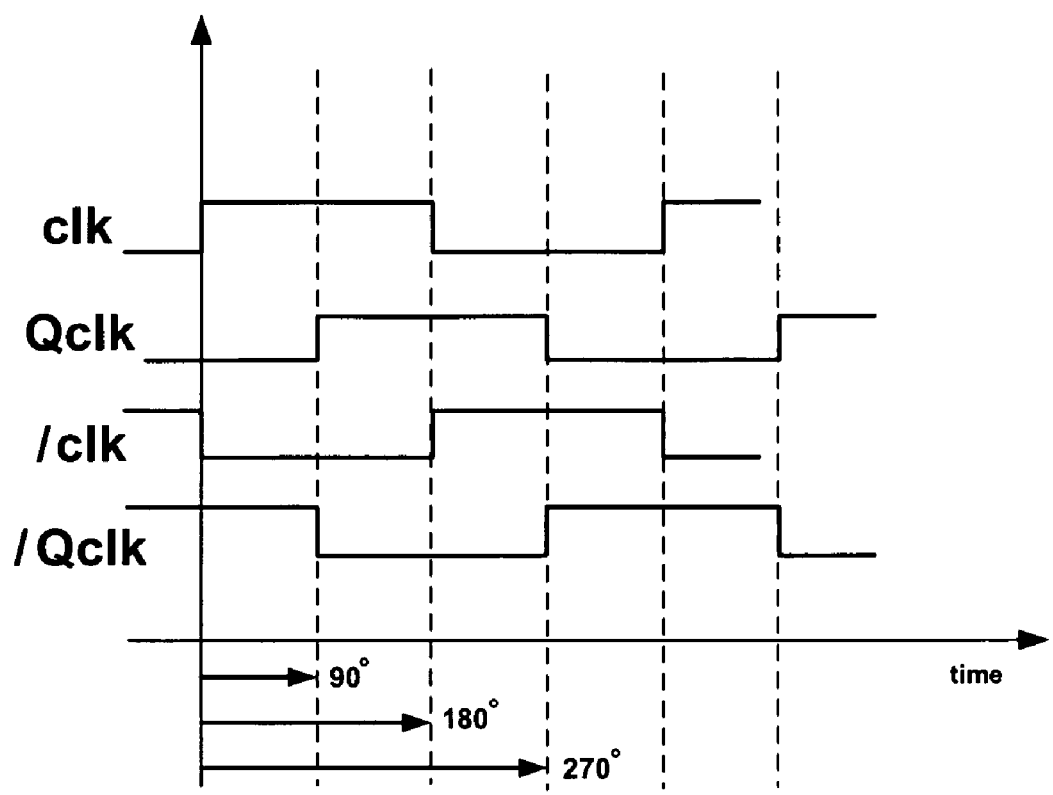
FIG. 5 is a timing diagram showing the phase relationships among the sampling clocks of the multi-phase set of sampling clocks, clk, Qclk, /clk, /Qclk, used by the instant-acquisition CDR circuit in FIG. 4.

FIG. 5 is a timing diagram comparing the phase relationships among the sampling clocks of this multi-phase set of sampling clocks, clk, Qclk, /clk, /Qclk. The quadrature sampling clock, Qclk, is rotated (i.e., is shifted in phase) ninety degrees relative to the in-phase sampling clock, clk. The inverse sampling clock, /clk, is shifted in phase one hundred eighty degrees relative to the in-phase sampling clock, clk. And, the inverse-quadrature sampling clock, /Qclk, is shifted in phase two hundred seventy degrees relative to the in-phase sampling clock, clk. When configured in this manner, four clock edges appear in every three hundred sixty degree rotation of the multi-phase set of clocks, i.e., in every unit interval (UI). It should be pointed out here that, while a four-phase set of sampling clocks, and a corresponding four flip-flops and four XOR gates are shown and described in this exemplary embodiment, any number of clock phases and corresponding flip-flops and XOR gates may be used, as will be readily appreciated by those of ordinary skill in the art. Further, whereas XOR gates are used to perform the logic operations, other logic gate types or combinations of logic gate types may be alternatively used to implement the same or similar logic functions, as will also be appreciated by those of ordinary skill in the art.

Data samples transferred to the Q outputs of adjacent pairs of the first, second, third and fourth flip-flops 402-1, 402-2, 402-3 and 402-4 are coupled to the inputs of the first, second, third and fourth XOR gates 404-1, 404-2, 404-3 and 404-4. The outputs of the first, second, third and fourth XOR gates 404-1, 404-2, 404-3 and 404-4 are then coupled to inputs W, X, Y and Z of the data path and clock phase selector 406. The significance of the labels "W", "X", "Y" and "Z" is discussed below. A multiplexer control signal at the output of the data path and clock phase selector 406 is coupled to the control inputs of both the aligned data multiplexer 408 and the recovered clock multiplexer 410.

Figures 6, 7:
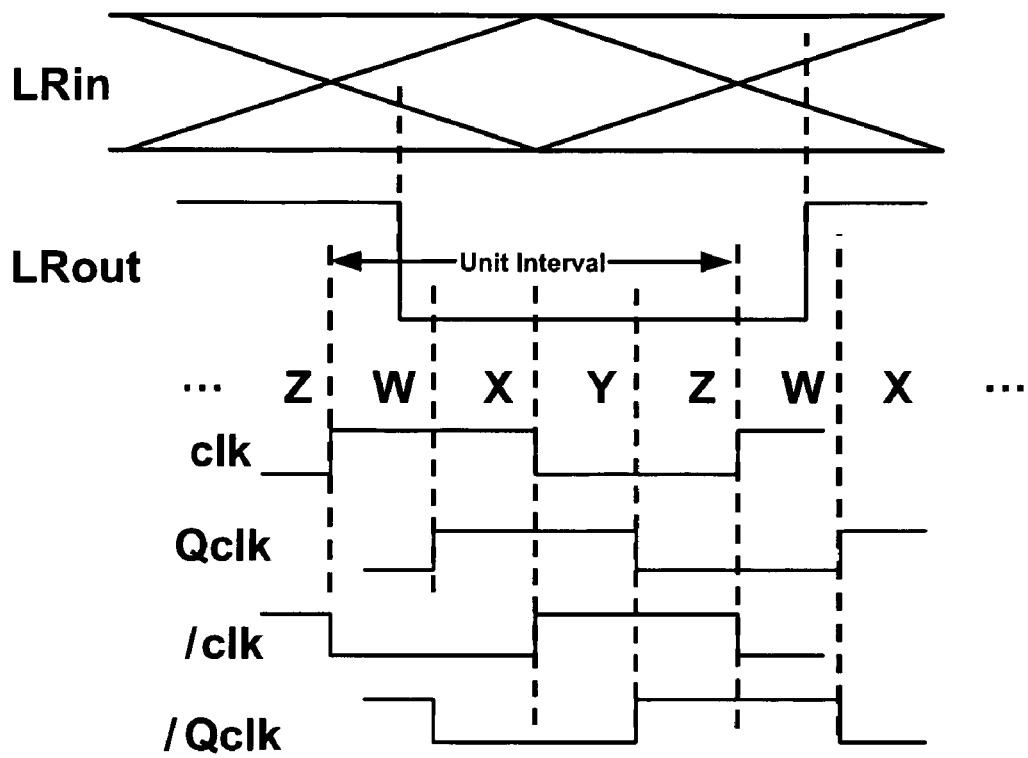
FIG. 6 is a timing diagram showing time and phase relationships among an eye pattern of a data stream received by a line receiver (LR) in a serial communications system, an exemplary data bit sequence at the output of the LR, and the multi-phase set of sampling clocks, clk, Qclk, /clk, /Qclk.
FIG. 7 is a truth table showing the correspondence between the subintervals, W, X, Y and Z, in the timing diagram in FIG. 5 and selection of the sampling clocks of the multi-phase set of sampling clocks, clk, Qclk, /clk, /Qclk.

According to an embodiment of the invention, the instant acquisition CDR circuit 400 is coupled to an LR within a serial data communication system, and is operable to sample a data stream, LRout, appearing at the output of the LR. FIG. 6 shows the timing relationships among an eye pattern of a data stream (LRin) received by the LR, an exemplary squared-up sequence of bits (LRout) in the data stream appearing at the output of the LR, and the multi-phase set of sampling clocks, clk, Qclk, /clk, /Qclk. Sampling of the data stream occurs after the LR squares up the received data stream, e.g., by use of a comparator or limiter circuit.

The multi-phase set of sampling clocks clk, Qclk, /clk, /Qclk, is configured so that the rising edge of each sampling clock in the set occurs once in a UI of time, where a UI corresponds to an expected time duration of a single data bit in the received data stream. The sampling clock edges of the multi-phase set of sampling clocks, clk, Qclk, /clk, /Qclk, further define repeating sequences of subintervals, W, X, Y, Z. Upon the occurrence of a data transition occurring in one of the subintervals, W, X, Y or Z, one of the flip-flops 402-1, 402-2, 402-3 and 402-4 will change state and one of the XOR gates 404-1, 404-2, 404-3 and 404-4 will correspondingly change logic state. Which flip-flop and which XOR gate changes state depends on which of the subintervals, W, X, Y or Z, the data transition occurs. For example, if a data transition occurs within the subinterval W, as in FIG. 6, the logic state of the second flip-flop 402-2 and the logic state of the second XOR gate 404-2 changes on the next rising edge of the quadrature clock, Qclk.

Based on the change in logic states of the XOR gates 404-1, 404-2, 404-3 and 404-4, the data path and clock phase selector 406 generates a multiplexer control signal for the aligned data multiplexer 408 and the recovered clock multiplexer 410. The recovered clock multiplexer 410 responds to the multiplexer control signal by selecting the sampling clock from among the multi-phase set of sampling clocks, clk, Qclk, /clk or /Qclk, that has a rising edge closest to the center of the data bit being sampled. For example, in the example shown in FIG. 6, the inverse sampling clock, /clk, is selected, since following the data transition in subinterval W, the inverse sampling clock, /clk, has a rising edge that is most toward the center of the bit being sampled, compared to the rising edges of the other sampling clocks. FIG. 7 is a truth table showing the correspondence of the inverse sampling clock, /clk, to the subinterval W, as well as the correspondence of the other sampling clocks (clk, Qclk and /Qclk) to the other subintervals, X, Y and Z. The data path and clock phase selector 406 includes the logic circuitry for implementing the various entries in the truth table.

As mentioned in the previous paragraph, the aligned data multiplexer 408 also responds to the multiplexer control signal provided by the data path and clock phase selector 406. Based on the value of the control signal applied to the aligned data multiplexer 408, the data provided by the flip-flop that is clocked by the clock phase that has been selected as the recovered clock is selected. In the example shown in FIG. 6, the data would be provided by the third flip-flop 402-3. In this manner, the data stream is properly aligned with sampling clock that has been selected to be the recovered clock.

Figure 8:
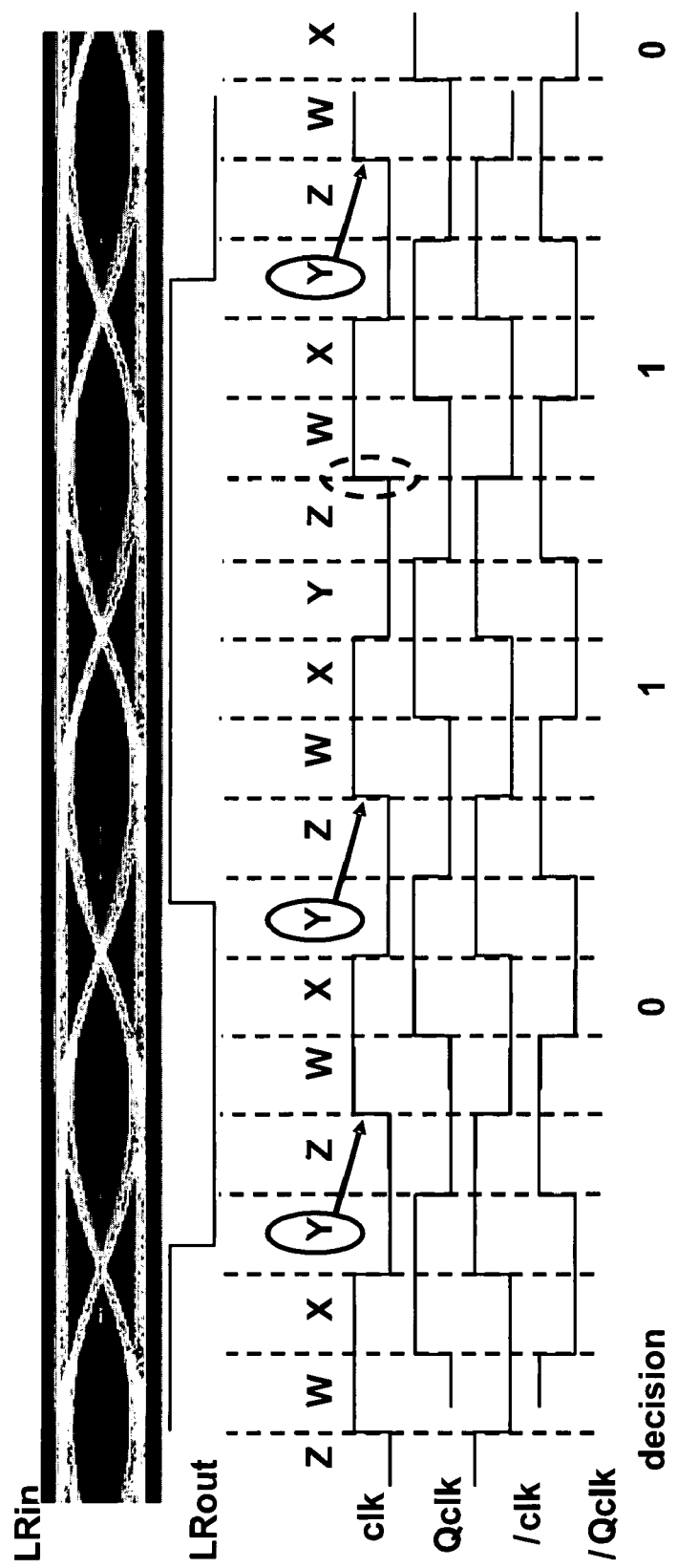
FIG. 8 is a timing diagram illustrating how a selected sampling clock from the multi-phase set of sampling clocks, clk, Qclk, /clk, /Qclk, is maintained in the absence of subsequent data transitions and when subsequent data transitions fall within the same subinterval Y.

FIG. 8 is a timing diagram illustrating how a selection of a sampling clock from the multi-phase set of sampling clocks, clk, Qclk, /clk, /Qclk, is maintained in the absence of subsequent data transitions or when subsequent data transitions fall within the same subinterval (e.g., subinterval Y) in a later subinterval sequence. The first data transition in the data stream LRout is seen to occur in subinterval Y. Accordingly, based on the truth table in FIG. 7, the data path and clock phase selector 406 generates a signal that selects the in-phase sampling clock, clk, as the recovered clock. The next data transition also occurs in subinterval Y, so the in-phase sampling clock, clk, is maintained as the recovered clock. If the data does not transition again before the occurrence of the next rising edge of the selected clock phase, the presently selected sampling clock is also maintained, as illustrated by the dashed ellipse encircling the rising edge of the in-phase sampling clock following the second data transition in LRout. In other words, the selected sampling clock decision is maintained between data transitions.

The timing diagrams in FIG. 8 also highlight that the clock and data recovery methods and systems of the present invention do not depend on past data transition events. Instead, they are performed as soon as a transition is detected in the incoming data stream, not as a result of an average of past data transitions as in prior art PLL-based CDR approaches.

Figure 9:
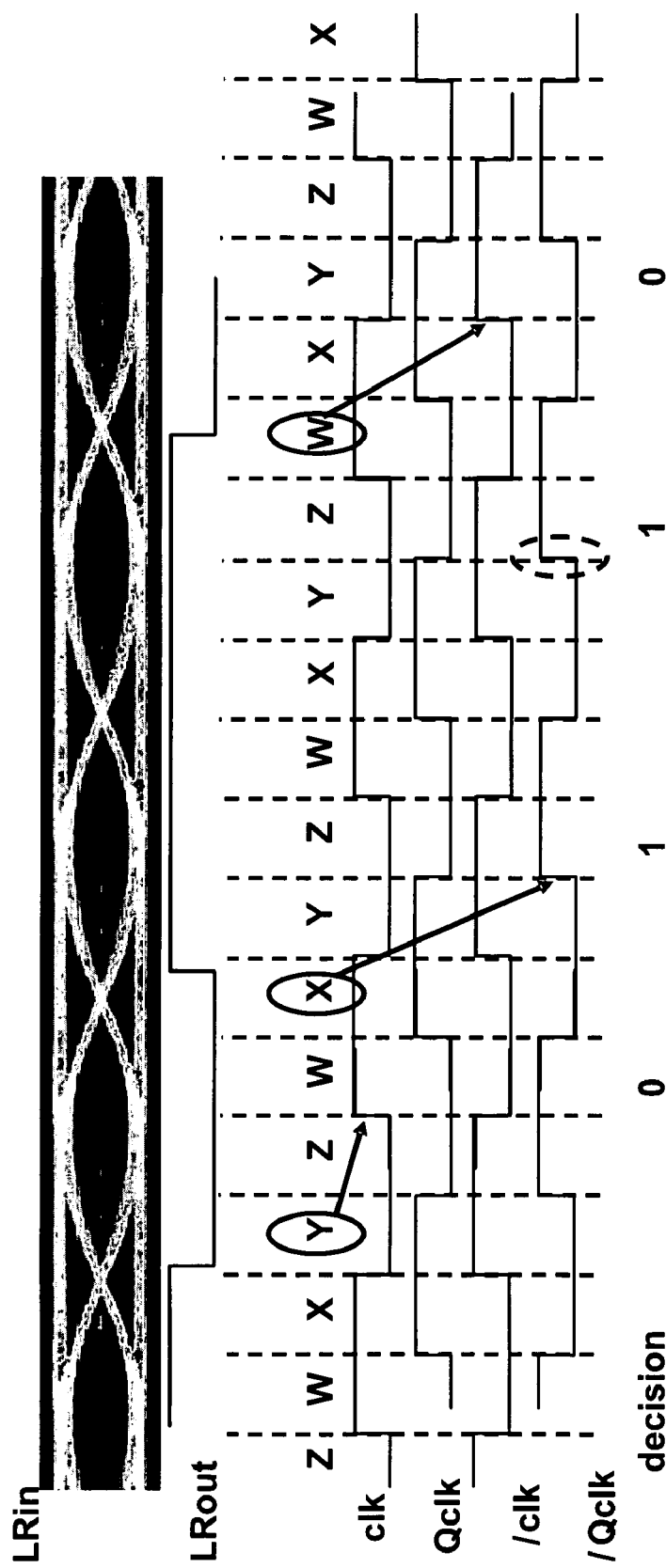
FIG. 9 is a timing diagram illustrating how the decision and selection of a sampling clock from among the multi-phase set of sampling clocks, clk, Qclk, /clk, /Qclk, is made based on the most recent data transition, and illustrating how data is correctly and accurately detected even in the presence of a very large clock frequency error.

Because the recovered clock and the aligned and sampled data are immediately determined following the occurrence of a data transition, and not by an averaging feedback process as in prior art PLL-based CDR approaches, the systems and methods of the present invention are able to correctly detect the data in the incoming data stream even with a very large clock frequency error. This is illustrated in FIG. 9, where the data rate is about 15% higher than the data rate in the example in FIG. 8. This frequency error is about 100 times greater than the error tolerable by prior art CDR approaches. The high data rate, compared to the frequencies of the local sampling clocks of the multi-phase set of sampling clocks, clk, Qclk, /clk, /Qclk, represents a very large frequency error. Despite the large frequency error of this example, the systems and methods of the present invention are able to correctly detect the data by rapidly selecting the most appropriate sampling clock from the multi-phase set of sampling clocks, clk, Qclk, /clk, /Qclk, as data transitions occur and are detected.

Figures 10A, 10B:
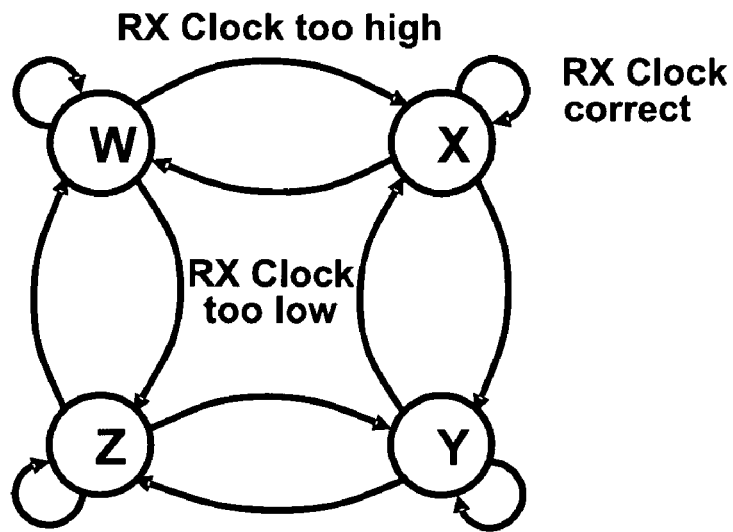
FIG. 10A is a subinterval transition diagram illustrating how adjacent data transition time subintervals in one direction (or the other) signify whether the frequency of the local multi-phase set of sampling clocks, clk, Qclk, /clk, /Qclk, is too high, too low, or correct.
FIG. 10B is a truth table illustrating how the various time subinterval transitions in the subinterval transition diagram in FIG. 10A are converted to frequency UP and DOWN commands.

FIG. 10A is a subinterval transition diagram illustrating how adjacent data transition time subintervals in one direction (or the other) signify whether the frequency of the local multi-phase set of sampling clocks is too high, too low, or correct. For example, a transition from subinterval W to subinterval X provides an indication that the frequency of the multi-phase set of sampling clocks is too high, while the reverse order provides an indication that the frequency of the multi-phase set of sampling clocks is too low. According to one embodiment of the invention, adjacent data transition time subintervals are converted to frequency UP and frequency DOWN commands, according to the truth table shown in FIG. 10B. As explained below, these frequency UP and frequency DOWN commands can be used for frequency-error reduction purposes. It is important to note that this frequency correction process operates while the CDR is correctly operating on the incoming data stream. As such, the present clock frequency correction process is a background process. This is in direct opposition to the prior art, where frequency correction must be accomplished successfully before any CDR operation can begin.

Figure 11:
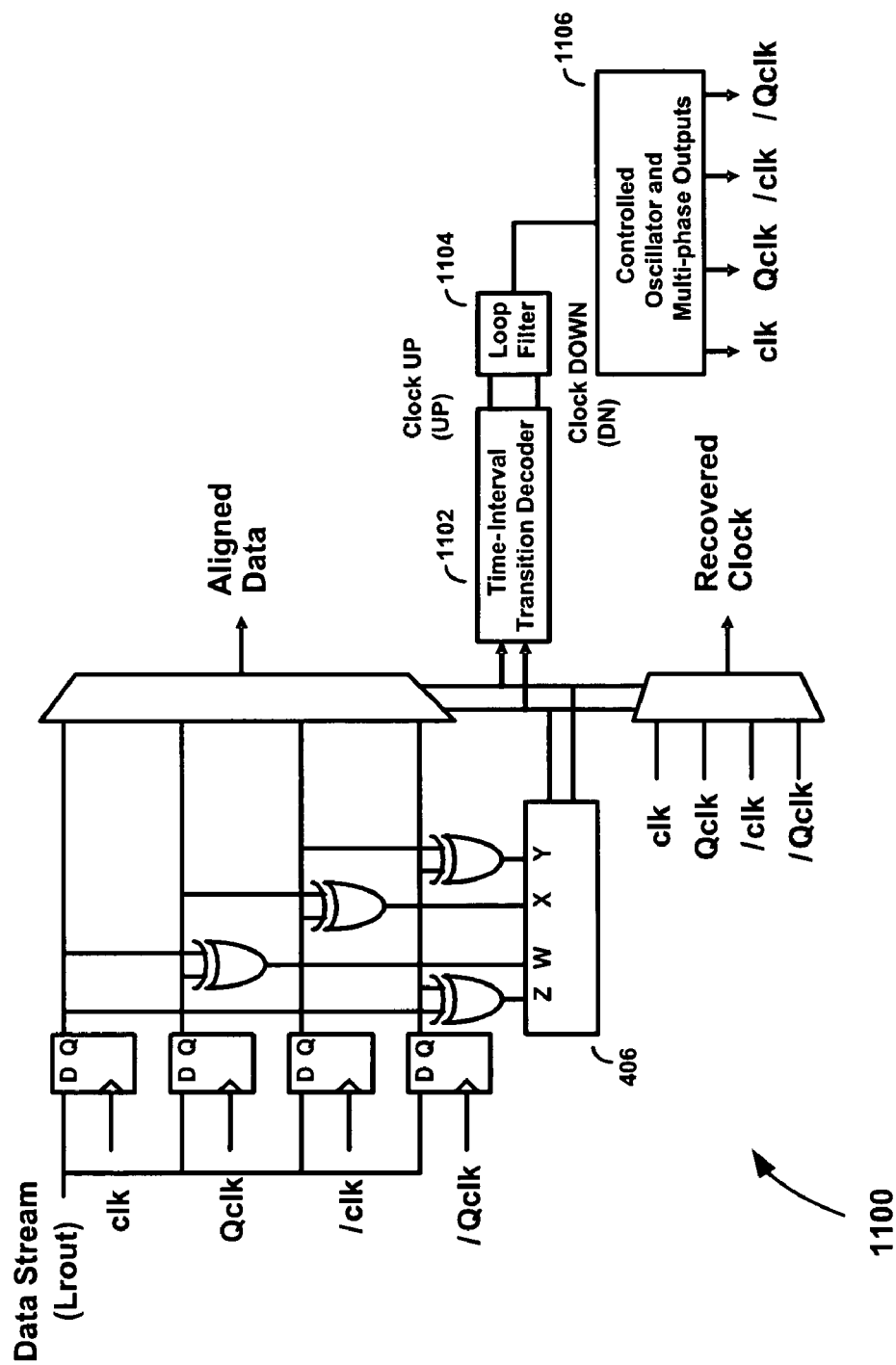
FIG. 11 is a diagram of an instant-acquisition CDR circuit similar to the instant-acquisition CDR circuit shown in FIG. 4, but which also includes frequency-error-reduction circuitry, according to an embodiment of the present invention.

FIG. 11 is a diagram of an instant-acquisition CDR circuit 1100 similar to the instant-acquisition CDR circuit shown in FIG. 4, but which also includes frequency-error-reduction circuitry, according to an embodiment of the present invention. The frequency-error-reduction circuitry comprises a subinterval transition decoder 1102 that implements the truth table in FIG. 10B, a loop filter 1104, and a multi-phase oscillator 1106 for generating the multi-phase set of clocks, clk, Qclk, /clk, /Qclk. The subinterval transition decoder 1102 generates frequency UP and frequency DOWN commands in response to the output of the data path and clock phase selector 406 and according to entries in the truth table in FIG. 10B. The loop filter 1104, which may comprise a conventional PLL loop filter, responds to the frequency UP and frequency DOWN commands by changing the control signal applied to the multi-phase oscillator 1106. In this manner, the frequency of the multi-phase set of sampling clocks, clk, Qclk, /clk, /Qclk, is corrected. Lock is achieved when the number of frequency UP commands received by the loop filter 1104 is, on average, equal to the number of frequency DOWN commands received by the loop filter 1104. This frequency correction process is performed while the serial communications link is active and communicating actual data, thereby reducing "stress" on the clock and data recovery process. No training sequence or header information is needed in the frequency correction process.

The present invention has been described with reference to specific exemplary embodiments. These specific exemplary embodiments are merely illustrative, and are not meant to restrict the present invention. They are also not meant to be limited for use in any particular application. For example, the instant-acquisition CDR methods and systems of the present invention may be used in an LR in a communication link formed between a data communication device such as a computing device and a peripheral device, a computing device and a storage device (e.g., a hard drive), a baseband controller and the radio in a battery powered wireless communications device (e.g., a cellular handset), between clock domains of a digital system, or other serial communications link. Accordingly, the spirit and scope of the inventions defined in the appended claims should not be construed as being restricted to any particular application.

What is claimed is:

1. A method of clock and data recovery, comprising:
   receiving a data stream;
   sampling said data stream using a multi-phase set of sampling clocks;
   upon the occurrence of a data transition in said data stream, designating a first sampling clock from among said multi-phase set of sampling clocks as a first recovered clock;
   upon the occurrence of a second data transition in said data stream, designating a second sampling clock from among said multi-phase set of sampling clocks as a second recovered clock; and
   recovering data bits from said data stream using said second recovered clock.

2. The method of claim 1, further comprising recovering data bits from said data stream using said first recovered clock.

3. The method of claim 2 wherein said data transition is a data transition of a first data bit appearing in the received data stream.

4. The method of claim 2 wherein designating a first sampling clock from among said multi-phase set of sampling clocks is performed independent of data transitions in said data stream that have occurred prior to the occurrence of said data transition.

5. The method of claim 2 wherein designating a first sampling clock from among said multi-phase set of sampling clocks is performed independent of data transitions in said data stream that occur following the occurrence of said data transition.

6. A method of clock and data recovery, comprising:
   sampling a data stream according to a multi-phase set of sampling clocks within a first unit interval, said first unit interval including a first plurality of subintervals defined by edges of the sampling clocks of said multi-phase set of sampling clocks;
   detecting an occurrence of a first data transition within a subinterval of said first plurality of subintervals;
   designating a first sampling clock from among said multi-phase set of sampling clocks as a recovered clock based on which subinterval of said first plurality of subintervals said first data transition occurs;
   sampling the data stream according to the multi-phase set of sampling clocks within a second unit interval following the first unit interval, said second unit interval including a second plurality of subintervals defined by edges of the sampling clocks of said multi-phase set of sampling clocks; and
   detecting an occurrence of a second data transition within a subinterval of said second plurality of subintervals,
   wherein the subinterval of said first plurality of subintervals within which said first data transition occurs is defined by edges of two of the sampling clocks of the multi-phase set of sampling clocks, and the subinterval of said second plurality of subintervals within which said second data transition occurs is also defined by edges of two of the sampling clocks of the multi-phase set of sampling clocks.

7. The method of claim 6 wherein designating said first sampling clock is performed independent of data transitions in said data stream that have occurred prior to the occurrence of said first data transition.

8. The method of claim 6 wherein designating said first sampling clock is performed independent of data transitions that follow the occurrence of said first data transition.

9. The method of claim 6 wherein designating said first sampling clock is performed prior to the occurrence of any subsequent data transition following the detected occurrence of said first data transition.

10. The method of claim 6 wherein the designated first sampling clock is maintained as the recovered clock from the time it is first designated and at least until the occurrence of a second data transition in said data stream.

11. The method of claim 7, further comprising maintaining the first sampling clock as the designated recovered clock if the two sampling clocks defining the subinterval of said first plurality of subintervals within which said first data transition occurs in said first unit interval are the same two sampling clocks defining the subinterval of said second plurality of subintervals within which said second data transition occurs in said second unit interval.

12. The method of claim 7, further comprising designating a second and different sampling clock from among said multi-phase set of sampling clocks if either of the two sampling clocks defining the subinterval of said first plurality of subintervals within which said first data transition occurs in said first unit interval is different from one of the two sampling clocks defining the subinterval of said second plurality of subintervals within which said second data transition occurs in said second unit interval.

13. The method of claim 7, further comprising correcting a frequency of the multi-phase set of sampling clocks based on which of the subintervals of the first plurality of subintervals the first data transition occurs and which of the subintervals in the second plurality of subintervals the second data transition occurs.

14. The method of claim 6, further comprising:
   detecting an occurrence of a second data transition within a different subinterval in the first plurality of subintervals of the same first unit interval in which the first data transition occurred; and
   designating a second sampling clock from among said plurality of multi-phase clocks as the recovered clock in place of the first sampling clock that had been selected to be the first recovered clock.

15. The method of claim 14, further comprising correcting a frequency of the multi-phase set of sampling clocks based on which subinterval of the first plurality of subintervals the first data transition occurs and which subinterval of the first plurality of subintervals the second data transition occurs.

16. A clock and data recovery circuit for a serial communications link receiver, comprising:
a time interval detector configured to sample a data stream within a unit interval of time according to a multi-phase set of sampling clocks, said unit interval of time including a plurality of subintervals defined by clock edges of said multi-phase set of sampling clocks;
logic circuitry configured to determine an occurrence of a data transition within one of said subintervals; and
a sampling clock selector configured to select, from among said multi-phase set of sampling clocks, a first recovered clock depending on which subinterval of said unit interval of said logic circuitry has determined that said data transition has occurred, and a second sampling clock from among said multi-phase set of sampling clocks as a second recovered clock that is aligned with data bits in said data stream, if data bits in said data stream become misaligned with said first recovered clock.

17. The clock and data recovery circuit of claim 16 wherein the sampling clock selector selects the first recovered clock based on data transitions that occurred after the occurrence of said data transition.

18. The clock and data recovery circuit of claim 16 wherein after said sampling clock selector has designated one of the set of sampling clocks as the first recovered clock, the selection is maintained for at least until a next occurring data transition occurs.

19. A serial communications receiver system, comprising:
a line receiver configured to receive a data stream from a serial communications link;
an instant-acquisition clock and data recovery circuit coupled to said line receiver, said clock and data recovery circuit including:
a time interval detector configured to sample said data stream according to a multi-phase set of sampling clocks, and
a sampling clock selector configured to designate a first sampling clock from among said multi-phase set of sampling clocks as a first recovered clock based on a data transition in the received data stream detected by said time interval detector, and
means for designating a second sampling clock from among said multi-phase set of sampling clocks as a second recovered clock that is aligned with data bits in said data stream, if data bits in said data stream become misaligned with said first recovered clock.

20. The serial communications receiver system of claim 19 wherein the designated first recovered clock is maintained from the time it is designated and at least until a next occurring data transition is detected by said time interval detector.

21. The serial communications receiver system of claim 19 wherein said clock selector is configured to designate one of the sampling clocks of said multi-phase set of sampling clocks as the first recovered clock, independent of data transitions in said data stream that may have occurred prior to the data transition detected by said time interval detector.

22. The serial communications receiver system of claim 19 wherein said clock selector is configured to designate one of the sampling clocks of said multi-phase set of sampling clocks as the first recovered clock, independent of data transitions in said data stream that may occur after the data transition is detected by said time interval detector.

23. The serial communications receiver system of claim 19 wherein said instant-acquisition clock and data recovery circuit is configurable to be powered down when no data is being received by the line receiver.

* * * * *

UNITED STATES PATENT AND TRADEMARK OFFICE
CERTIFICATE OF CORRECTION

| | | |
|---|---|---|
| PATENT NO. | : 7,929,644 B2 | Page 1 of 1 |
| APPLICATION NO. | : 12/024744 | |
| DATED | : April 19, 2011 | |
| INVENTOR(S) | : McCune, Jr. | |

It is certified that error appears in the above-identified patent and that said Letters Patent is hereby corrected as shown below:

Col. 10, Lines 31, 39 and 48

Claims 11, 12 and 13 depend off of Claim 7 wherein they should depend off of Claim 6.

Signed and Sealed this
Sixteenth Day of August, 2011

David J. Kappos
*Director of the United States Patent and Trademark Office*